(12) United States Patent
McCallister et al.

(10) Patent No.: US 6,222,878 B1
(45) Date of Patent: Apr. 24, 2001

(54) COMMUNICATION SYSTEM WITH END-TO-END QUADRATURE BALANCE CONTROL

(75) Inventors: Ronald D. McCallister, Scottsdale; Bruce A. Cochran, Mesa, both of AZ (US)

(73) Assignee: Sicom, Inc., Phoenix, AZ (US)

( * ) Notice: Subject to any disclaimer, the term of this patent is extended or adjusted under 35 U.S.C. 154(b) by 0 days.

(21) Appl. No.: 09/407,132

(22) Filed: Sep. 27, 1999

(51) Int. Cl.[7] .................................. H04B 1/38; H04L 5/16
(52) U.S. Cl. ......................... 375/225; 375/281; 375/284; 455/67.3; 455/69
(58) Field of Search ........................... 375/219, 221, 375/223, 225, 227, 259, 269, 279, 280, 281, 284, 308, 329, 332; 455/42, 63, 67.1, 67.3, 69, 70, 500, 501; 329/304; 332/103

(56) References Cited

U.S. PATENT DOCUMENTS

| | | | |
|---|---|---|---|
| 5,351,016 | | 9/1994 | Dent ...................................... 332/103 |
| 5,642,378 | * | 6/1997 | Denheyer et al. .................... 375/216 |
| 5,687,188 | * | 11/1997 | Feeney et al. ........................ 375/220 |
| 5,721,756 | | 2/1998 | Liebetreu et al. .................... 375/344 |
| 5,737,365 | * | 4/1998 | Gilbert et al. ........................ 375/224 |
| 5,809,009 | * | 9/1998 | Matsuoka et al. ................... 370/206 |
| 5,949,832 | | 9/1999 | Liebetreu et al. .................... 375/344 |
| 5,982,813 | * | 11/1999 | Dutta et al. .......................... 375/219 |
| 5,987,068 | * | 11/1999 | Cassia et al. ........................ 375/281 |
| 5,995,552 | * | 11/1999 | Moriyama ............................ 375/271 |
| 6,023,615 | * | 2/2000 | Bruckert et al. .................. 455/277.2 |
| 6,108,374 | * | 8/2000 | Balachandran et al. ............. 375/227 |

OTHER PUBLICATIONS

Hikmet Sari and Georges Karam, "Asymmetric Baseband Equalization", IEEE Transactions on Communications, vol. 36, No. 9 Sep. 1988.
James K. Cavers, "The Effect of Quadrature Modulator and Demodulator Errors on Adaptive. Digital Predistorters for Amplifier Linearization" IEEE Transactions on Vehicular Technology, vol. 46, No. 2, May 1997.

* cited by examiner

Primary Examiner—Young T. Tse
(74) Attorney, Agent, or Firm—Lowell W. Gresham; Jordan M. Meschkow; Meschkow & Gresham P.L.C.

(57) ABSTRACT

A communication system (10) includes a transmitter (20) having programmable signals (46, 58, 60, 80) which can be used to adjust transmitter-caused quadrature-phase signal imbalances. A receiver (18) of the system (10) is remotely located from the transmitter (20) and generates a signal quality statistic (102, 112) that is monitored in a slow-tracking feedback loop to formulate commands which indicate how to program the programmable signals (46, 58, 60, 80). This receiver (18) performs its signal quality statistic monitoring while a data stream (36) is being extracted from a received communication signal.

20 Claims, 5 Drawing Sheets

COMMUNICATION SYSTEM WITH END-TO-END QUADRATURE BALANCE CONTROL

TECHNICAL FIELD OF THE INVENTION

This invention relates to digital communication systems. More specifically, the present invention relates to digital communication systems which adaptively balance quadrature-phase signals.

BACKGROUND OF THE INVENTION

Digital communication systems conventionally use analog circuits near transmit and receive ports and use digital circuits elsewhere. In other words, transmitters convert digital modulated signals to analog signals which are subsequently processed by analog mixing, analog filtering, and amplifying before a communication signal is actually transmitted. Likewise receivers perform certain analog amplifying, analog filtering, and analog mixing prior to converting a received communication signal into a digital signal from which conveyed data are extracted.

Likewise, conventional digital communication systems convey a data stream via quadrature-phase modulation, wherein the data stream is modulated into a complex signal that has orthogonal signal components. Accordingly, in a conventional digital communication system, the orthogonal signal components are often processed separately by separate analog components positioned near transmit and receive ports.

The processing of separate orthogonal signal components by separate analog components causes a long-recognized problem. In particular, errors result when the orthogonal signal components are not truly orthogonal. For the typical situation, this occurs when in-phase (I) signals and quadrature-phase (Q) signals are not precisely 90° apart. Errors also result when the peak amplitudes of orthogonal signal components are not precisely equal and when carrier leakage occurs. Carrier leakage results when the carrier does not precisely equal zero for a zero modulating waveform.

Prior art solutions to this quadrature imbalance problem include the use of well-matched analog components and the use of analog components that are trimmed with trim potentiometers and the like. However, this solution is undesirable because it leads to the use of expensive components, expensive labor costs during manufacture, and reliability problems as components drift over time and temperature.

Another prior art solution to this quadrature imbalance problem relies on adaptive equalizers and other adaptive circuits located in the receiver. While this solution has been adequate for many applications it is not ideal. Less error can now be tolerated in the received communication signal compared to an ideal modulated communication signal in the more modern communication systems. Less error can now be tolerated because power levels must be kept as low as possible to maintain transmissions within an assigned frequency band and higher modulation orders are being used to convey communications. Accordingly, if the receiver implements receiver-applied corrections to correct a transmitter imbalance, such receiver-applied corrections are applied to noise as well as signal. Consequently, such corrections tend to exaggerate the influence of noise in the received communication signal. Moreover, if quadrature imbalance at a transmitter is extreme, then a receiver-implemented correction may be utterly unsuccessful.

Another prior art solution to this quadrature imbalance problem relies on a separate, dedicated, special purpose receiver co-located with a transmitter to detect quadrature imbalance conditions at the transmitter and take corrective actions. While this solution does not face the problem of distinguishing between receiver imbalances and transmitter imbalances, this solution is highly undesirable due to the expense of the special purpose receiver to be co-located with the transmitter.

Accordingly, a need exists for a communication system that corrects for quadrature signal imbalance in a transmitter using the same system receiver that is used to extract data from a received communication signal.

SUMMARY OF THE INVENTION

Accordingly, it is an advantage of the present invention that an improved communication system with end-to-end quadrature balance control is provided, wherein end-to-end refers to involvement by both ends of a communication link.

Another advantage is that quadrature-phase signal imbalances at a transmitter are ameliorated using a receiver located at a site remote to the transmitter site.

Another advantage is that errors in a modulator are distinguished from errors in a demodulator so that corrective commands may be formulated to ameliorate modulator errors.

The above and other advantages of the present invention are carried out in one form by a method carried out in a digital communication system. The method ameliorates a bit error rate for a data stream transmitted from a first site to a second site. The method calls for receiving a communication signal at the second site. The communication signal conveys the data stream. A signal quality statistic is generated at the second site. The signal quality statistic is determined from the communication signal. A command is formulated at the second site in response to the signal quality statistic, the command is transmitted at the second site, and the command is received at the first site. At the first site, a quadrature balance signal is adjusted in response to the command. The quadrature balance signal alters one of first and second quadrature-phase signals relative to the other, where the first and second quadrature-phase signals collectively convey the data stream. The quadrature-phase signals are combined at the first site to form the communication signal, and the communication signal is transmitted.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
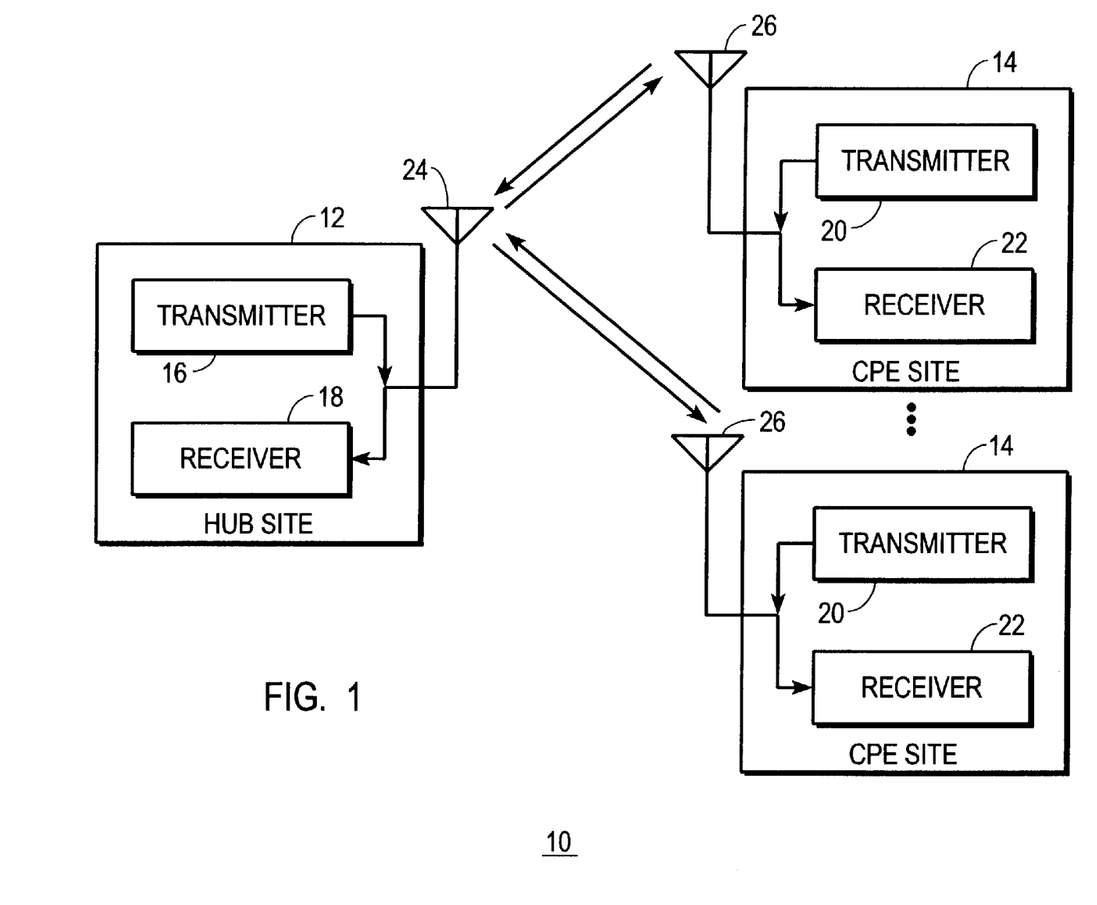
FIG. 1 shows a block diagram of a communication system configured in accordance with the present invention.

FIG. 1 shows a block diagram of a communication system 10 configured in accordance with the present invention. System 10 includes a hub site 12 and any number of customer premise equipment (CPE) sites 14. CPE sites 14 are distal or remote from hub site 12. Each CPE site 14 communicates with hub site 12, but CPE sites 14 need not communicate with each other.

Hub site 12 includes a transmitter 16 and a receiver 18, and each CPE site includes a transmitter 20 and a receiver 22. In the embodiment illustrated in FIG. 1, hub transmitter 16 and hub receiver 18 share a common antenna 24, and CPE transmitter 20 and CPE receiver 22 share a common antenna 26. Communication occurs via an RF transmission medium. However, neither common site antennas nor an RF communication medium are requirements of the present invention.

As discussed in more detail below, system 10 implements an end-to-end feed back loop which includes CPE transmitter 20, a reverse path 28 of a bi-directional communication link 30, hub receiver 18, hub transmitter 16, a forward path 32 of bi-directional communication link 30, and CPE receiver 22. In general, hub receiver 18 is configured to drive this feed back loop so that a signal quality statistic generated in hub receiver 18 indicates a local optimum condition. The signal quality statistic is generated from a communication signal received at hub receiver 18. In response to this signal quality statistic, commands are formulated at hub receiver 18 and transmitted to CPE site 14 where the commands serve as the basis for altering quadrature-phase signal balance parameters in CPE transmitter 20. The quadrature-phase signal balance parameters alter the communicated signal which alters the signal quality statistic.

By using hub receiver 18 to alter quadrature-phase signal balance parameters in CPE transmitters 20 until a local optimum point is achieved, efficient and high performance digital communications may result because signal error is reduced. Moreover, no special purpose receiver dedicated to the function of correcting CPE transmitter 20 quadrature-phase signal balance parameters is required to be located at CPE site 14. Since communication system 10 may include a large number of CPE sites 14, the overall costs are diminished considerably. Moreover, inexpensive components which may experience a certain amount of drift may be used because communication system 10 adapts itself to the real-world components actually being used.

Figure 2:
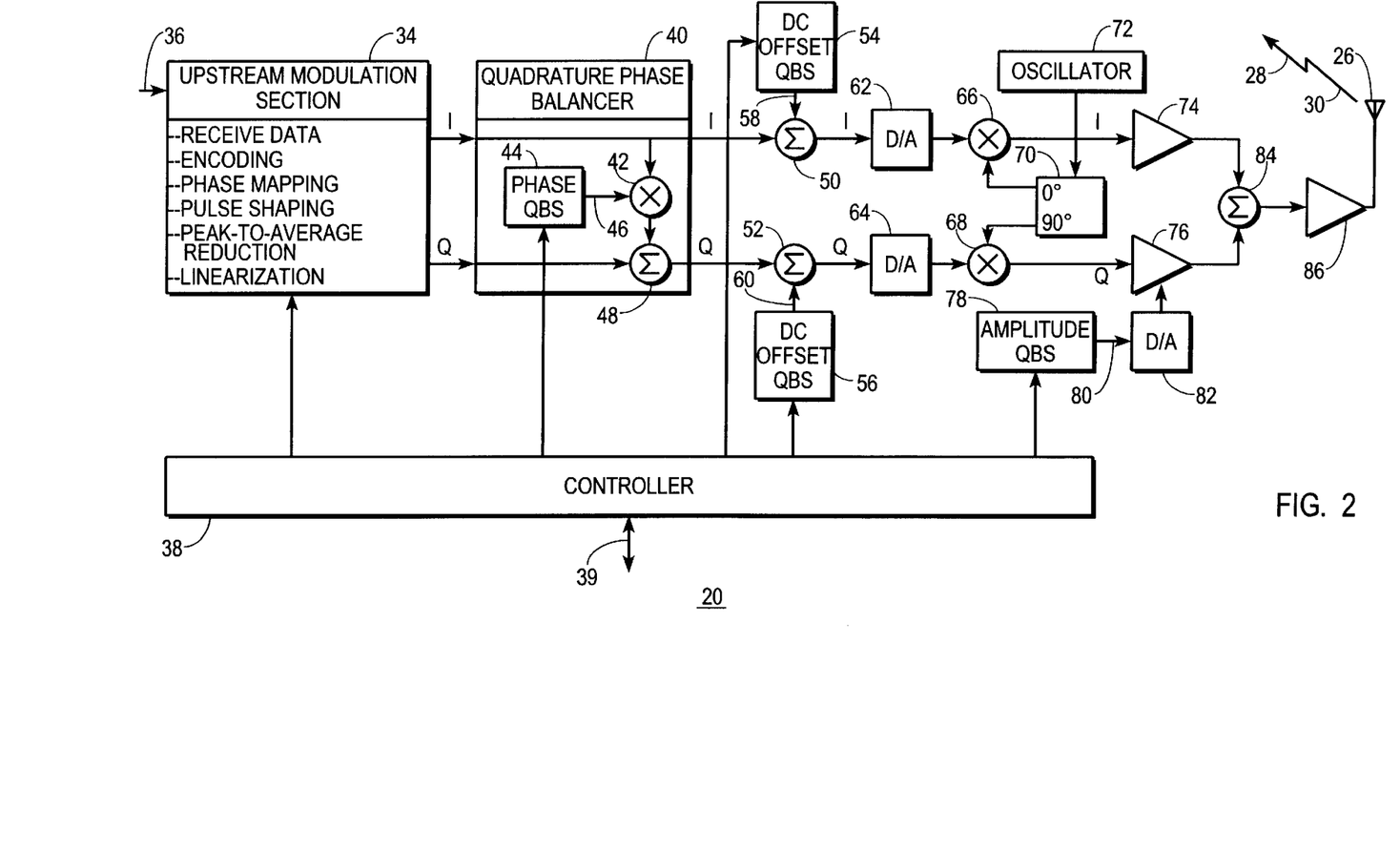
FIG. 2 shows a block diagram of a transmitter portion of the communication system of FIG. 1.

FIG. 2 shows a block diagram of an exemplary CPE transmitter 20. The FIG. 2 block diagram may also suffice for hub transmitter 16 (FIG. 1), but the below-presented discussion focuses on CPE transmitter 20 for convenience.

CPE transmitter 20 includes a digital upstream modulation section 34. Upstream modulation section 34 receives a raw data stream 36 made up of customer and system data and performs conventional digital modulation processes on data stream 36. Such modulation processes include receiving the data from customer equipment (not shown) and from system 10, as may be provided by a controller 38 for CPE transmitter 20. Controller 38 includes a path 39 through which controller 38 may be in data communication with other devices, such as CPE receiver 22 (FIG. 1).

In addition, data stream 36 may be encoded using block, convolutional and/or other encoding techniques. Then data stream 36 is phase mapped into a complex phase space in accordance with a phase constellation for a given modulation order. This mapping often takes place through the use of a look-up table. As a result of phase mapping, data stream 36 is conveyed as two quadrature-phase signals, conventionally represented as in-phase (I) and quadrature-phase (Q) signals. The complex, phase mapped data stream 36 is pulse shaped using digital filtering techniques (e.g., a raised cosine, Nyquist or root Nyquist filter) so that the energy from each unit baud interval of the data stream is spread out in time over many baud intervals but confined in frequency. A peak-to-average reduction function may be implemented on the pulse shaped, complex data stream 36 to limit the linear range over which subsequent amplification will be required to operate. In addition, a linearization function may be performed to pre-distort the complex data stream to compensate for non-linearities to be experienced when the complex data stream 36 subsequently experiences amplification by an amplifier that does not have perfectly linear transformation characteristics. Accordingly, data stream 36 exits upstream modulation section 34 as digital quadrature-phase signals (e.g., I and Q) which have been highly processed.

The quadrature-phase signals which convey data stream 36 and which are output from upstream modulation section 34 are routed to a quadrature phase balancer 40. In the embodiment depicted in FIG. 2, the I quadrature-phase signal passes through quadrature phase balancer 40 and couples to a first input of a multiplier 42 within balancer 40. Controller 38 couples to a latch 44 to generate a phase quadrature balance signal (QBS) 46. Phase QBS 46 is routed to a second input of multiplier 42, and an output of multiplier 42 couples to a first input of a summing circuit 48. The Q quadrature-phase signal from upstream modulation section 34 couples to a second input of summing circuit 48, and an output of summing circuit 48 serves as the Q output for quadrature phase balancer 40.

In a theoretical transmitter the I and Q quadrature-phase signals that convey a data stream should be modulated using carrier signals which are precisely 90° out-of-phase. However, in real-world transmitters, obtaining such precision is often difficult and/or expensive. Maintaining such precision over time and temperature is even more of a burden. In the theoretical transmitter, controller 38 should place a value of zero in latch 44 so that substantially none of the I quadrature-phase signal is cross-fed to the Q quadrature-phase signal. However, in a real-world transmitter, this value probably would generally not be zero. By using an appropriate scale factor which causes a small amount of one of the quadrature-phase signals to be added to the other, the effect of small phase changes between the quadrature-phase signals can be simulated. Using this technique, phase QBS 46 is adjusted to alter the relative phase between the quadrature-phase signals to compensate for a lack of precise quadrature conditions in a subsequent mixing stage. The determination of an appropriate scale factor value for generating phase QBS 46 is discussed below.

The I and Q quadrature-phase signals which convey data stream 36 and which are output from quadrature phase balancer 40 are routed to first inputs of summing circuits 50 and 52, respectively. Controller 38 couples to inputs of DC offset quadrature balance signal (QBS) latches 54 and 56, respectively. DC offset QBS'S 58 and 60 generated from latches 54 and 56 are respectively routed to second inputs of summing circuits 50 and 52. By programming latches 54 and 56, DC offset QBS's 58 and 60 are generated which add (or subtract) a slight DC bias to the I and Q quadrature-phase signals that convey data stream 36. Such DC biases are useful in compensating for oscillator leakage which occurs when the carrier does not precisely equal zero for a zero modulating waveform. The determination of an appropriate scale factor value for generating phase QBS 46 is discussed below.

In the exemplary embodiment depicted in FIG. 2, the I and Q quadrature-phase signals which convey data stream 36 and which are output from DC offset summing circuits 50 and 52 are respectively routed to inputs of digital-to-analog (D/A) converters 62 and 64. Until encountering D/A converters 62 and 64, the quadrature-phase signals which convey data stream 36 have been processed digitally. While FIG. 2 illustrates separate signal paths for the sake of understanding, those skilled in the art will appreciate that one set of hardware and one set of physical component signal paths may be used to process both of the quadrature-phase signals. Assuming sufficient capacity is provided, no imbalance will result from the digital processing. However, beginning at D/A converters 62 and 64, the quadrature-phase signals which convey data stream 36 will be processed separately in separate analog components. Consequently, the quadrature-phase signals may now experience different processing due to offsets, gain imbalances, phase shifting imprecision, and the like, and become imbalanced as a result.

The outputs from D/A converters 62 and 64 are respectively routed to first inputs of up-conversion mixers 66 and 68. Second inputs of mixers 66 and 68 couple to 0° and 90° outputs of a phase splitter 70. Phase splitter 70 may be the source of a phase imbalance between the quadrature-phase signals that convey data stream 36, and mixers 66 and 68 may be the source of a carrier leakage imbalance. An input of phase splitter 70 couples to an output of an oscillator 72 which provides a carrier signal.

Outputs of mixers 66 and 68 respectively couple to inputs of amplifiers 74 and 76. Amplifiers 74 and 76 may be the source of amplitude imbalance between the quadrature-phase signals that convey data stream 36. Accordingly, at least one of amplifiers 74 and 76 is configured so that its gain is controllable. Controller 38 couples to an amplitude quadrature balance signal (QBS) latch 78 which generates an amplitude QBS 80 that is routed to an input of a D/A converter 82. An output of D/A converter 82 drives a controllable gain input of the one of amplifiers 76 and 74 that has controllable gain. By adjusting the gain of one of amplifiers 74 and 76, the peak amplitudes of the quadrature-phase signals which convey data stream 36 may be kept equal. The determination of appropriate gain factor values for generating amplitude QBS 80 is discussed below.

The amplitude balance adjustment implemented through the use of amplitude QBS 80 is implemented in analog circuitry in FIG. 2 merely to illustrate that QBS's 46, 58, 60 and 80 may affect either analog or digital adjustments. Amplifier 76 need not be a controllable gain amplifier as shown and D/A converter 82 may be omitted if a multiplier (not shown) controlled by QBS 80 is inserted in one of the quadrature-phase signal legs upstream of D/A converters 62 and 64. Likewise, one or more of quadrature phase balancer 40 and summing circuits 50 and 52 may be implemented in analog rather than digitally as shown. Analog implementation may be realized by placing equivalent analog circuits (not shown) downstream of D/A converters 62 and 64 and by adding D/A converters (not shown) to convert QBS'S 46, 58 and/or 60 into analog form for application to such equivalent analog circuits.

Outputs of amplifiers 74 and 76 couple to first and second inputs of a summing circuit 84. Summing circuit 84 combines the quadrature-phase signals that convey data stream 36 to form a communication signal. The output of summing circuit 84 couples to an input of a power amplifier 86, and the output of power amplifier 86 couples to antenna 26, from which the communication signal is transmitted over reverse path 28 of bi-directional communication link 30.

Figure 3:
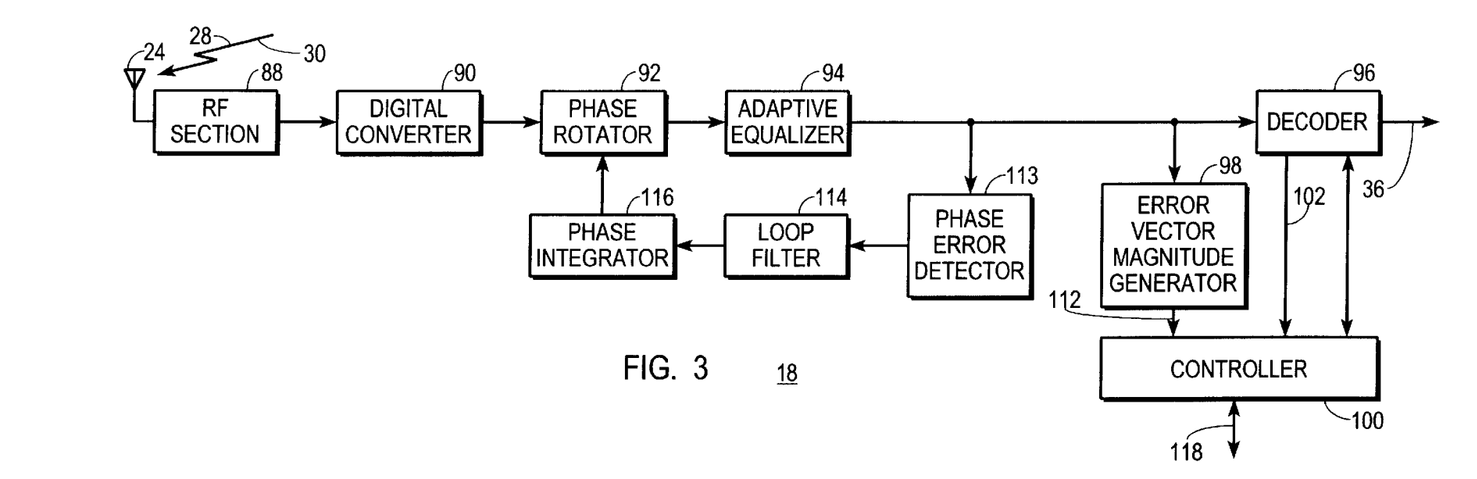
FIG. 3 shows a block diagram of a receiver portion of the communication system of FIG. 1.

FIG. 3 shows a block diagram of an exemplary hub receiver 18. The FIG. 3 block diagram may also suffice for CPE receiver 22 (FIG. 1), but the below-presented discussion focuses on hub receiver 18 for convenience.

At antenna 24 hub receiver 18 receives the communication signal transmitted over reverse path 28 of bi-directional communication link 30. Antenna 24 couples to an input of an RF section 88, which performs RF amplification, filtering, and down-conversion in a manner known to those skilled in the art. A baseband version of the communication signal is output from RF section 88 and routed to an input of a digital converter 90. Digital converter 90 digitizes the communication signal.

Although not shown in FIG. 3 for simplicity, digital converter and/or RF section 88 desirably generate quadrature-phase signals which are analogous to the quadrature-phase signals discussed above in connection with FIG. 2. Moreover, circuits included in RF section 88 and digital converter 90 may be responsible for quadrature-phase signal imbalance in addition to the imbalance errors discussed above in connection with FIG. 2. However, downstream of digital converter 90 the communication signal is processed digitally, and further imbalance errors will not be introduced assuming sufficient processing capacity is provided.

The communication signal, as processed into digital quadrature-phase signals, which is output from digital converter 90 is routed to a first input of a phase rotator 92. Phase rotator 92 is used to close a carrier tracking loop that allows receiver 18 to match and track the carrier frequency used by CPE transmitter 20 (FIGS. 1–2). The frequency used by CPE transmitter 20 is desirably well-matched before data stream 36 may be successfully extracted from the communication signal.

The communication signal output from phase rotator 92 is routed to an adaptive equalizer 94. Adaptive equalizer 94 implements a digital filter which adapts itself to compensate for distortions in the communication channel. Adaptive equalizer 94 may attempt to adapt itself or otherwise compensate for quadrature-phase signal imbalances, whether occurring in CPE transmitter 20 or hub receiver 18. However, adaptive equalizer 94 exhibits a response time which is relatively fast compared to other response times discussed below. In other word, adaptive equalizer 94 quickly adapts itself to be the appropriate filter for the conditions experienced from moment-to-moment. To the extent that adaptive equalizer 94 attempts to adapt itself to compensate for transmitter-induced quadrature-phase signal imbalances, it will exaggerate noise. The exaggeration of noise may lead to a worsened bit error rate (BER).

The communication signal, represented as a pair (not shown) of quadrature-phase signals, which is output from adaptive equalizer 94 is routed to a decoder 96, to an error vector magnitude generator 98, and to a phase error detector 113. Decoder 96 need not be included in the carrier tracking loop. Decoder 96 is used to extract data stream 36 from the communication signal. Decoder 96 may implement convolutional and/or block decoding and other decoding techniques well known to those skilled in the art in extracting data stream 36 from the communication signal. Moreover, decoder 96 is desirably programmable so that it can perform decoding functions which are appropriate for a given modulation order. Such programming may be provided from a controller 100. In addition, decoder 96 desirably generates a bit error rate (BER) signal 102 that characterizes the error rate associated with data stream 36. BER signal 102 is desirably routed to controller 100.

For the purposes of the present invention, BER represents one of many possible signal quality statistics. Thus, BER is a quantified characterization of the quality of data in data stream 36, and BER may be determined by analyzing the entirety of data stream 36 or a sample of that entire population. However determined, the lower the BER, the higher or better the signal quality.

Error vector magnitude generator 98 need not be included in the carrier tracking loop either. Error vector magnitude generator 98 determines the error between the received communication signal, as input to generator 98, and an ideal communication signal. Those skilled in the art will appreciate that digital communication signals are originally configured in a transmitter to exhibit only ideal phase states defined by quadrature-phase signals as set forth in a phase constellation (not shown) which implements a given modulation order. However, due to the inevitable presence of noise and other errors, such as quadrature-phase signal imbalances discussed above, the received phase states invariably fail to precisely match the ideal phase states. The degree to which received phase states deviate from the ideal is considered error, and generator 98 outputs a signal characterizing the magnitude of that error.

Figure 4:
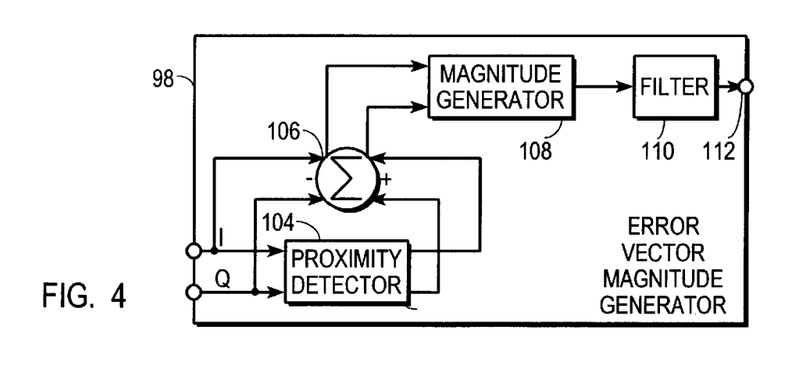
FIG. 4 shows a block diagram of an error vector magnitude generator portion of the receiver of FIG. 3.

FIG. 4 shows a block diagram of an exemplary error vector magnitude generator 98. The communication signal as expressed through I and Q quadrature-phase signals is input to a proximity detector 104 and to a negative input of a summing circuit 106. In each unit baud interval, proximity detector 104 identifies the nearest "ideal" phase point to the phase point indicated by the I and Q quadrature-phase signals input to generator 98 during the unit baud interval. Summing circuit 106 performs a complex subtraction operation to form a complex vector that represents the difference. This difference may be viewed as phase error. The difference vector is routed to a magnitude generator 108 which converts it to a scalar magnitude value and routes it to a filter 110. The output of generator 98 is an error vector magnitude (EVM) signal 112 which characterizes the departure of a received communication signal from the ideal.

Referring back to FIG. 3, EVM signal 112 is routed to controller 100.

Phase error detector 113 is part of the carrier tracking loop. Phase error detector 113 determines, for each unit baud interval, the complex difference vector between a received phase state and the nearest ideal phase state. Thus, phase error detector 113 may include a proximity detector and summing circuit configured substantially as discussed above in FIG. 4, or phase error detector 113 may be implemented using a look-up table. In one embodiment, the output from summing circuit 106 (FIG. 4) may serve as phase error detector 113.

A phase error signal output of phase error detector 113 is routed to a loop filter 114 for the carrier tracking loop. Loop filter 114 is configured so that the carrier tracking loop also converges quickly to match the carrier frequency, compared to response times discussed below. A filtered phase error signal is routed from loop filter 114 to a phase integrator 116.

Phase integrator 116 transforms the filtered phase error signal into a phase signal suitable for feeding back to phase rotator 92 to close the carrier tracking loop.

EVM signal 112, which is routed to controller 100 from error vector magnitude generator 98, represents another one of the many possible signal quality statistics. Thus, EVM is a quantified characterization of the quality of data in data stream 36, and EVM may be determined by analyzing the entirety of data stream 36 or from a sample of that entire population. However determined, if EVM is lower on average, then signal quality is higher and BER will be lower as a result.

Controller 100 includes a path 118 through which controller 100 may be in data communication with other devices, such as hub transmitter 16.

Figure 5:
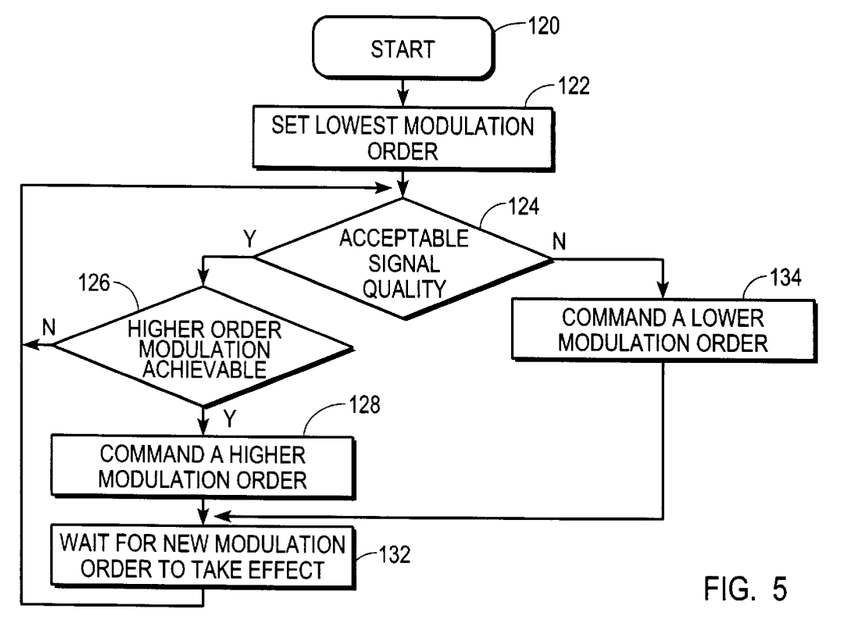
FIG. 5 shows a flow chart of an exemplary process used by the communication system to establish a bi-directional communication link between remotely located sites.

FIG. 5 shows a flow chart of an exemplary process 120 used by communication system 10 (FIG. 1) to establish bi-directional communication link 30 (FIG. 1) between remotely located sites 12 and 14 (FIG. 1). Process 120 is desirably carried out by controller 100 (FIG. 3) of hub receiver 18 and/or a similar controller in CPE receiver 22 (FIG. 1). However, the following discussion will focus upon the process 120 carried out in hub receiver 18 for convenience. Those skilled in the art will appreciate that hub receiver 18 may concurrently carry out many processes, including process 120. Moreover, those skilled in the art will appreciate that the controller that carries out process 120 and other controllers discussed below are desirably microprocessor-controlled devices which implement processes defined in software programming. Such controllers may include I/O devices, timers, peripheral equipment, and memory (not shown). The memory stores the software programming executed to cause the controller to perform the process.

Process 120 includes a task 122 in establishing bi-directional link 30. During task 122, the modulation order is set to the lowest modulation order supported by communication system 10. In one embodiment, system 10 may implement QPSK, 16-QAM, 64-PSK, and 256-PSK modulation orders. In this embodiment, task 122 would set the QPSK modulation order. This low modulation order is desirable because it is the most tolerant of noise and phase error. The modulation order may be set by appropriately programming decoder 96 (FIG. 3) and phase mapping functions in upstream modulation section 34 (FIG. 2) of the transmitter, via data communication through paths 118 (FIG. 3) and 39 (FIG. 2).

In general, the lowest modulation order is sufficiently low that communication link 30 can be established in the face of extreme quadrature-phase signal imbalance at CPE transmitter 20 and extreme noise conditions. Program control may wait at task 122 for a time sufficient for initial data exchanges between CPE site 14 and hub site 12 to establish communication link 30. In other words, while waiting at task 122, hub site 12 (FIG. 1) is operated to receive data from CPE site 14 (FIG. 1) and vice-versa.

After waiting in task 122, a query task 124 determines whether the signal quality of the received communication signal is acceptable. Task 124 may monitor BER signal 102, output from decoder 96 (FIG. 3), EVM signal 112 output from EVM generator 98 (FIG. 3) or another signal quality statistic in making its determination.

So long as signal quality is deemed acceptable, a query task 126 is performed to determine whether a higher order modulation might be achievable. Generally speaking, higher order modulations are more desirable because they permit a greater data rate at a given power level and baud. Higher order modulations are achievable when noise and errors are sufficiently low so that hub receiver 18 (FIG. 3) will make few mistakes in decoding data stream 36 at a higher modulation order where the "ideal" phase points are positioned more closely together. This situation might be predicted when a current modulation order is achieving a signal quality that is unnecessarily high.

If task 126 determines that a higher modulation order does not seem achievable, then program flow loops back to task 124. However, if task 126 determines that a higher modulation order seems achievable, then a task 128 commands a higher modulation order. The higher modulation order may be achieved by altering programming in decoder 96 (FIG. 3) and in phase mapping functions in upstream modulation section 34 (FIG. 2). Following task 128, a task 132 is performed to cause process 120 to wait while the new modulation order is taking effect. After waiting in task 132, program control loops back to task 124.

When task 124 discovers that signal quality is becoming unacceptable, a task 134 is performed to command a lower modulation order. After task 134, program control proceeds to task 132 to wait for the new modulation order to take effect, then loops back to task 124.

Accordingly, process 120 continuously operates to establish and maintain bi-directional communication link 30 at a modulation order for which an acceptable signal quality is achieved. Even when extreme quadrature-phase signal imbalances are present in transmitters 16 and 20 (FIG. 1), CPE site 14 and hub site 12 may communicate data back and forth. While process 120 discusses only varying modulation order to establish and maintain bi-directional communication link 30, those skilled in the art will appreciate that baud and in some situations transmitter power may likewise be varied to provide a greater range of conditions over which data stream 36 may be communicated, albeit somewhat slowly.

Figure 6:
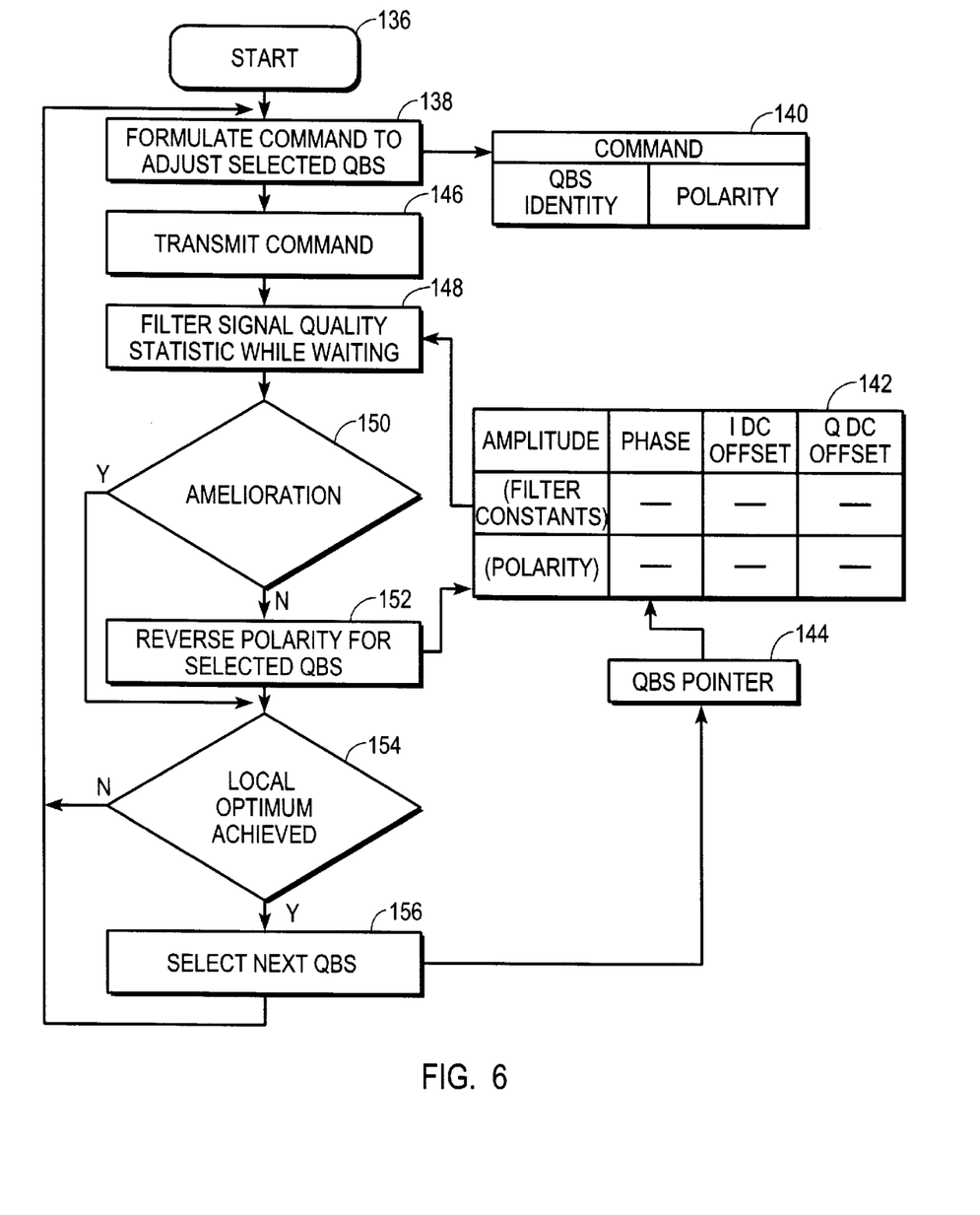
FIG. 6 shows a flow chart of an exemplary process used by the receiver to formulate commands for adjusting quadrature balance signals located in the transmitter.

FIG. 6 shows a flow chart of an exemplary process 136 used by hub receiver 18 (FIGS. 1 and 3) to formulate commands for adjusting quadrature balance signals located in CPE transmitter 20 (FIGS. 1–2). Process 136 is desirably carried out by controller 100 (FIG. 3) of hub receiver 18 and/or a similar controller in CPE receiver 22 (FIG. 1). However, the following discussion will focus upon the process 136 carried out in hub receiver 18 for convenience. Process 136 is performed so long as bi-directional communication link 30 is established, and other processes, such as process 120 (FIG. 5), may operate concurrently with process 136. Process 136 is performed while data stream 36 (FIG. 3) is being extracted from the communication signal received at hub receiver 18.

Process 136 includes a task 138 in which a command 140 is formulated to adjust a selected quadrature balance signal (QBS). As indicated in FIG. 6, command 140 may include data which identifies a specific QBS. In the preferred embodiment discussed herein, possible identities include: phase QBS 46, I DC offset QBS 58, Q DC offset QBS 60, and amplitude QBS 80 (FIG. 2). In addition, command 140 may include a polarity indication. The polarity indication may be obtained from a sequence table 142 which has a pointer variable 144. Pointer variable 144 stores data which identifies a selected one of the above-discussed QBS signals. FIG. 6 indicates a selection of phase QBS 46 (FIG. 2), but variable 144 may be altered to indicate another selection. Task 138 may simply extract the polarity indication in table 142 for the currently selected QBS in formulating command 140.

Following task 138, a task 146 transmits command 140 to CPE site 14 (FIG. 1). Task 138 may cause command 140 to be communicated by passing command 140 through path 118 (FIG. 3) to hub transmitter 16 (FIG. 1), whereupon command 140 will be placed in the data stream going to CPE site 14 with appropriate addressing so that CPE site 14 will recognize command 140 as directed to it and not as user data. Command 140 may then be transferred from CPE receiver 22 (FIG. 1) to CPE transmitter 20 through data path 39 (FIG. 2).

Next, a task 148 is performed to filter a monitored signal quality statistic while waiting to make an evaluation. Task 148 causes the end-to-end feedback loop implemented by communication system 10 to exhibit a response time much slower than the response times exhibited by adaptive equalizer 94 (FIG. 3) or the carrier tracking loop of hub receiver 18. Accordingly, adaptive equalizer 94 and the carrier tracking loop operate to wash out quadrature-phase signal imbalances resulting from hub receiver 18. The remaining quadrature-phase signal imbalance results from CPE transmitter 20 and has been distinguished from receiver-generated imbalances. Desirably, the filter characteristics employed at task 148 are sufficient for command 140 to be implemented in CPE transmitter 20, for adaptive equalizer 94 and the carrier tracking loop to stabilize, and for the signal quality statistic to be well filtered or averaged to minimize momentary anomalies. The filter characteristics may differ for different selected QBS's and such characteristics may be obtained from table 142.

While response time in the end-to-end feedback loop is desirably slow, such a slow response time is adequate to the transmitter quadrature-phase imbalance problem. In particular, the source of this problem is primarily time and temperature drift in analog components. Such drifts tend to occur very slowly, compared to the response time of adaptive equalizer 94 and the carrier tracking loop.

Task 148 may monitor any of a variety of signal quality statistics, including BER signal 102 and/or EVM signal 112 (FIG. 3). BER signal 102 may require less filtering then EVM signal 112, but the use of BER signal 102 may cause the response time of the end-to-end feedback loop implemented by communication system 10 to be somewhat slower than a response time that might result from using EVM signal 112.

Following task 148, a query task 150 determines whether amelioration in the bit error rate has occurred. Task 150 compares the results of the signal quality statistic filtered above in task 148 with a previous signal quality statistic saved from one or more previous iterations of task 150. Task 150 may desirably be configured to implement a variety of algorithms to determine whether a given current signal quality statistic value when compared to past values amounts to amelioration. For example, task 150 may be implemented to incorporate some form of hysteresis. If task 150 decides that no amelioration has occurred (i.e. the signal quality has worsened), a task 152 reverses the polarity for the selected QBS in table 142.

After task 152 and when task 150 determines that amelioration or no change has occurred, a query task 154 is performed. Task 154 determines whether a local optimum condition has been achieved. A local optimum may be determined by forming a running average of the polarity indicated in table 142 for the selected QBS. If polarities are allowed to exhibit values of "0" for decrease and "1" for increase, then a running average over a predetermined number of iterations of task 154 in the range of 0.4–0.6 may indicate that a local optimum condition has been achieved. In this situation, after several iterations through a QBS alteration process which includes tasks 138, 146, 148, 150, 152 and 154, no consistent direction for changing the selected QBS parameter appears to produce improvement. When the running average is outside a range centered on 0.5, then the QBS alteration process appears to be changing the selected QBS in a consistent direction that leads to improvement in signal quality and ameliorated bit error rate. However, those skilled in the art may devise other algorithms for determining that a local optimum has been achieved.

Those skilled in the art will appreciate that a local optimum condition refers to making the signal quality statistic indicate as effective, perfect, or useful a signal quality as possible given the current configuration of communication system 10. If the current configuration changes, for example if power increases, a different quadrature balance signal adjustment is made, the noise environment changes, or the like, then a different local optimum may be obtainable.

When task 154 determines that a local optimum condition has not yet been achieved, program control remains in the QBS alteration process loop, which includes tasks 138, 146, 148, 150, 152 and 154. Program control remains in the QBS alteration process loop for a plurality of iterations until the signal quality statistic indicates a local optimum condition. When a local optimum condition is eventually detected at task 154, a task 156 alters QBS pointer 144 to point to or otherwise select another QBS. Following task 156, program control returns for several iterations of the QBS alteration process loop with the new QBS being selected for adjustment.

Accordingly, process 136 continuously repeats to constantly adjust the QBS's one at a time, in sequence, while data are being extracted in hub receiver 18.

Figure 7:
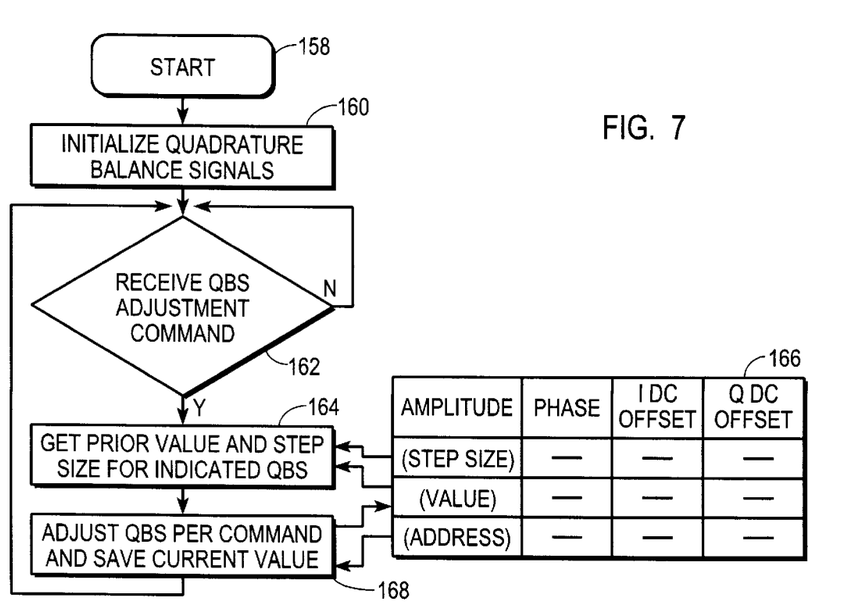
FIG. 7 shows a flow chart of an exemplary process used by the transmitter to effect commands formulated in accordance with the process of FIG. 6.

FIG. 7 shows a flow chart of an exemplary process 158 used by CPE transmitter 20 to effect command 140 (FIG. 6) in CPE transmitter 20. Process 158 is desirably carried out by controller 38 (FIG. 2) of CPE transmitter 20 and/or a similar controller in hub transmitter 16 (FIG. 1). However, the following discussion will focus upon the process 158 carried out in CPE transmitter 20 for convenience. Process 158 is performed so long as bi-directional communication link 30 is established, and other processes may operate concurrently with process 158. Process 158 is performed while data stream 36 (FIG. 2) is being modulated into the communication signal and transmitted from CPE transmitter 20.

Process 158 includes a task 160 which initializes the quadrature balance signals (QBS) with suitable default values. As discussed above, the quadrature balance signals may include: phase QBS 46, I DC offset QBS 58, Q DC offset QBS 60, and amplitude QBS 80 (FIG. 2).

Next, a query task 162 determines whether a QBS adjustment command 140 (FIG. 6) has been recently received. Command 140 may be received through data path 39 (FIG. 2). If no command 140 has been received, then program control waits at task 162. When a command 140 is eventually received, a task 164 is performed to obtain a prior value stored in the QBS latch 44, 54, 56 or 78 for the QBS indicated in the command 140. This value may be obtained from a QBS maintenance table 166. In addition, task 164 may obtain a step size from table 166 for the indicated QBS.

After task 164, a task 168 adds or subtracts the step size obtained above in task 164 from the prior value stored in the indicated QBS latch, saves this current value back into table 166, and writes this current value to the indicated QBS latch to adjust the indicated QBS as instructed in command 140. The address to which the current value may be written can also be obtained from table 166.

After task 168, program control loops back to task 162, and continuously repeats the programming loop that includes tasks 162, 164 and 168 while transmitting data stream 36 (FIG. 2) from CPE transmitter 20 (FIGS. 1–2).

As a result of adjusting the identified QBS in task 168, one quadrature-phase signal is adjusted relative to the other quadrature-phase signal. Phase error and/or BER in hub receiver 18 (FIGS. 1 and 3) may change as a result. As discussed above in connection with FIG. 6, if the change ameliorates bit error rate, then another command 140 which causes another step of the same polarity is issued to adjust the selected QBS signal. If the change worsens bit error rate, then another command 140 which causes a step of the opposite polarity is issued to adjust the selected QBS signal. When a local optimum condition is reached, then the process repeats to adjust another QBS.

In summary, the present invention provides an improved communication system with end-to-end quadrature balance control. Quadrature-phase signal imbalances at a transmitter are ameliorated using a receiver located at a site remote to the transmitter's site. Errors in a modulator are distinguished from errors in a demodulator so that corrective commands are formulated to ameliorate the modulator errors.

Although the preferred embodiments of the present invention have been illustrated and described in detail, it will be readily apparent to those skilled in the art that various modifications and equivalents may be made therein without departing from the spirit of the invention or from the scope of the appended claims. For example, those skilled in the art will be able to greatly alter the precise signal flows and process flows indicated herein while implementing an equivalent communication system.

What is claimed is:

1. In a digital communication system, a method for ameliorating a bit error rate for a data stream transmitted from a first site to a second site, said method comprising:

a) receiving a communication signal at said second site, said communication signal conveying said data stream;

b) generating a signal quality statistic at said second site, said signal quality statistic being determined from said communication signal;

c) formulating a command at said second site in response to said signal quality statistic;

d) transmitting said command at said second site;

e) receiving said command at said first site;

f) adjusting, at said first site, a quadrature balance signal in response to said command, said quadrature balance signal altering one of first and second quadrature-phase signals relative to the other, said first and second quadrature-phase signals collectively conveying said data stream;

g) combining said quadrature-phase signals at said first site to form said communication signal; and h) transmitting said communication signal at said first site.

2. A method for ameliorating the bit error rate as claimed in claim 1 wherein said first and second sites are distally located relative to one another.

3. A method for ameliorating the bit error rate as claimed in claim 1 wherein, prior to said receiving activity a), said method additionally comprises establishing a bi-directional communication link between said first and second site.

4. A method for ameliorating the bit error rate as claimed in claim 3 wherein said establishing activity comprises adjusting a modulation order parameter of said communication link.

5. A method for ameliorating the bit error rate as claimed in claim 1 additionally comprising extracting said data stream from said communication signal at said second site.

6. A method for ameliorating the bit error rate as claimed in claim 5 wherein said extracting activity is responsive to said signal quality statistic.

7. A method for ameliorating the bit error rate as claimed in claim 5 wherein:
  in a first quadrature balance signal alteration process, said formulating activity c), said transmitting activity d), said receiving activity e) and said adjusting activity f) are performed a plurality of times to alter relative phase between said first and second quadrature-phase signals;
  in a second quadrature balance signal alteration process, said formulating activity c), said transmitting activity d), said receiving activity e) and said adjusting activity f) are performed a plurality of times to alter relative amplitude between said first and second quadrature-phase signals;
  in a third quadrature balance signal alteration process, said formulating activity c), said transmitting activity d), said receiving activity e) and said adjusting activity f) are performed a plurality of times to alter a DC offset of said first quadrature-phase signal;
  in a fourth quadrature balance signal alteration process, said formulating activity c), said transmitting activity d), said receiving activity e) and said adjusting activity f) are performed a plurality of times to alter a DC offset of said second quadrature-phase signal; and
  said first, second, third, and fourth quadrature balance signal alteration processes continuously repeat while performing said extracting activity.

8. A method for ameliorating the bit error rate as claimed in claim 1 wherein said quadrature balance signal alters relative phase between said first and second quadrature-phase signals.

9. A method for ameliorating the bit error rate as claimed in claim 1 wherein said quadrature balance signal alters relative amplitude between said first and second quadrature-phase signals.

10. A method for ameliorating the bit error rate as claimed in claim 1 wherein said quadrature balance signal alters DC offsets of said first and second quadrature-phase signals.

11. A method for ameliorating the bit error rate as claimed in claim 1 wherein:
  said formulating activity c), said transmitting activity d), said receiving activity e) and said adjusting activity f) are repeatedly performed to adjust said quadrature balance signal until said signal quality statistic indicates a local optimum condition.

12. A method for ameliorating the bit error rate as claimed in claim 11 wherein:
  said method additionally comprises adaptively equalizing said communication signal at said second site, said adaptively equalizing activity exhibiting a first response time; and
  said adjusting activity f) adjusts said quadrature balance signal in an end-to-end feedback loop that exhibits a second response time, said second response time being slower than said first response time.

13. A method for ameliorating the bit error rate as claimed in claim 12 wherein said end-to-end feedback loop is configured to optimize said signal quality statistic.

14. A method for ameliorating the bit error rate as claimed in claim 1 wherein said signal quality statistic is one of an error vector magnitude parameter and a bit error rate parameter.

15. A digital communication system which ameliorates a bit error rate of a data stream while communicating said data stream, said system comprising:
  a first receiver located at a first site;
  a first transmitter located at said first site, said first transmitter being configured to generate a quadrature balance signal which alters one of first and second quadrature-phase signals relative to the other, said first and second quadrature-phase signals collectively conveying said data stream, and said first transmitter being configured to combine said quadrature-phase signals to form a communication signal and to transmit said communication signal;
  a second receiver located at a second site, said second receiver being configured to receive said communication signal which conveys said data stream, to generate a signal quality statistic determined from said communication signal and to formulate a command in response to said signal quality statistic; and
  a second transmitter located at said second site and configured to transmit said command so that said command can be received by said first receiver;
  wherein said first transmitter is further configured to adjust said quadrature balance signal in response to said command.

16. A system as claimed in claim 15 wherein said first transmitter, first receiver, second transmitter, and second receiver are collectively configured to establish a bi-directional communication link prior to transmitting said command.

17. A system as claimed in claim 15 wherein:
  said quadrature balance signal is a first quadrature balance signal which alters relative phase between said first and second quadrature-phase signals;
  said transmitter is additionally configured to generate a second quadrature balance signal which alters relative amplitude between said first and second quadrature-phase signals;
  said transmitter is additionally configured to generate a third quadrature balance signal which alters a DC offset of said first quadrature-phase signal; and
  said transmitter is additionally configured to generate a fourth quadrature balance signal which alters a DC offset of said second quadrature-phase signal.

18. A system as claimed in claim 15 wherein said signal quality statistic is one of an error vector magnitude parameter and a bit error rate parameter.

19. In a digital communication system, a method for ameliorating a bit error rate for a data stream transmitted from a first site to a second site, said method comprising:
  a) establishing a bi-directional communication link between said first and second sites;
  b) receiving a communication signal at said second site, said communication signal conveying said data stream;
  c) generating a signal quality statistic at said second site, said signal quality statistic being determined from said communication signal;
  d) formulating a command at said second site in response to said signal quality statistic;

e) transmitting said command at said second site;

f) receiving said command at said first site;

g) adjusting, at said first site, a quadrature balance signal in response to said command, said quadrature balance signal altering one of first and second quadrature-phase signals relative to the other, said first and second quadrature-phase signals collectively conveying said data stream;

h) combining said quadrature-phase signals at said first site to form said communication signal;

i) transmitting said communication signal at said first site; and j) repeating said formulating step d), said transmitting step e), said receiving step f) and said adjusting step g) to adjust said quadrature balance signal until said signal quality statistic indicates a local optimum condition.

20. A method for ameliorating the bit error rate as claimed in claim 19 wherein:

said quadrature balance signal is a first quadrature balance signal which alters relative phase between said first and second quadrature-phase signals;

said adjusting step additionally adjusts a second quadrature balance signal which alters relative amplitude between said first and second quadrature-phase signals;

said adjusting step additionally adjusts a third quadrature balance signal which alters a DC offset of said first quadrature-phase signal; and said adjusting step additionally adjusts a fourth quadrature balance signal which alters a DC offset of said second quadrature-phase signal.

\* \* \* \* \*